(12) United States Patent
Kordus

(10) Patent No.: US 11,897,084 B2
(45) Date of Patent: Feb. 13, 2024

(54) COMPACT MATERIAL REMOVAL MACHINES

(71) Applicant: ILLINOIS TOOL WORKS INC., Glenview, IL (US)

(72) Inventor: Bryan John Kordus, Twin Lakes, WI (US)

(73) Assignee: Illinois Tool Works Inc., Glenview, IL (US)

(*) Notice: Subject to any disclaimer, the term of this patent is extended or adjusted under 35 U.S.C. 154(b) by 1130 days.

(21) Appl. No.: 16/538,994

(22) Filed: Aug. 13, 2019

(65) Prior Publication Data
US 2020/0078902 A1    Mar. 12, 2020

Related U.S. Application Data

(60) Provisional application No. 62/728,552, filed on Sep. 7, 2018.

(51) Int. Cl.
*B24B 41/04* (2006.01)
*B24D 5/12* (2006.01)
*B24B 27/06* (2006.01)
*B24B 27/00* (2006.01)
(Continued)

(52) U.S. Cl.
CPC .......... *B24B 41/04* (2013.01); *B24B 27/0084* (2013.01); *B24B 27/0608* (2013.01);
(Continued)

(58) Field of Classification Search
CPC ... B24B 27/06; B24B 27/065; B24B 27/0084; B24B 27/0608; B24B 41/02;
(Continued)

(56) References Cited

U.S. PATENT DOCUMENTS 2,201,658 A * 5/1940 Whitney ................ B23D 59/02
83/490
2,726,651 A * 12/1955 Tucker ................... B28D 1/042
451/231
(Continued)

FOREIGN PATENT DOCUMENTS

CN     103128860     6/2013
CN     204748276     11/2015
(Continued)

OTHER PUBLICATIONS

International Searching Authority, "International Search Report and Written Opinion," issued in connection with International Patent Application No. PCT/US2019/049996, dated Jan. 2, 2020, 10 pages.

*Primary Examiner* — Joel D Crandall
*Assistant Examiner* — Makena S Markman
(74) *Attorney, Agent, or Firm* — McAndrews, Held & Malloy, Ltd.

(57) ABSTRACT

Apparatus, assemblies, and/or systems related to material removal are disclosed, such as saws, grinders, polishers, and/or more general material preparation and/or testing machines, for example. A material removal system may include a material removal machine that is configured to move via a material removal assembly. The material removal machine also includes a material removal tool configured to spin on a spindle at the urging of a tool actuator. The tool actuator is integrated into the material removal machine, such that the tool actuator moves along with the material removal machine.

7 Claims, 8 Drawing Sheets

(51) Int. Cl.
 *B24B 47/20* (2006.01)
 *B24B 41/02* (2006.01)
(52) U.S. Cl.
 CPC .............. *B24B 41/02* (2013.01); *B24B 47/20* (2013.01); *B24D 5/12* (2013.01)
(58) Field of Classification Search
 CPC ....... B24B 41/06; B24B 41/005; B24B 41/04; B24B 47/02; B24B 47/12; B24B 47/04; B24B 47/08; B24B 47/20; B24D 5/12; B28D 1/042; B28D 1/043; B28D 1/044; B28D 5/023; B28D 5/026; B23D 47/08; B23D 59/006
 See application file for complete search history.

(56) References Cited

U.S. PATENT DOCUMENTS

| | | | | |
|---|---|---|---|---|
| 3,311,103 A * | 3/1967 | Simpson | ................ | B28D 1/042 125/13.03 |
| 3,621,829 A * | 11/1971 | Maluck | .................. | B28D 1/047 125/13.03 |
| 4,094,102 A * | 6/1978 | Lauze | .................... | B24B 27/065 451/127 |
| 4,376,356 A * | 3/1983 | Everett | ................ | B23D 45/042 451/236 |
| 7,823,575 B2 * | 11/2010 | O'Banion | ............ | B23D 47/025 451/340 |
| 8,926,407 B2 * | 1/2015 | Lewkoski | ............... | B24B 27/04 15/198 |
| 2002/0174860 A1 * | 11/2002 | Cullen | ................... | B28D 1/042 125/13.01 |
| 2019/0039201 A1 * | 2/2019 | Müller | ................... | B23Q 1/623 |

FOREIGN PATENT DOCUMENTS

| | | |
|---|---|---|
| CN | 205290629 | 6/2016 |
| CN | 205703658 | 11/2016 |
| CN | 206010742 | 3/2017 |
| JP | H05104433 | 4/1993 |

* cited by examiner

COMPACT MATERIAL REMOVAL MACHINES

CROSS REFERENCE TO RELATED APPLICATIONS

This application claims priority from, and the benefit of, U.S. Provisional Application Ser. No. 62/728,552, entitled "COMPACT MATERIAL REMOVAL MACHINES," filed Sep. 7, 2018, the entirety of which is hereby incorporated by reference.

TECHNICAL FIELD

The present disclosure generally relates to material removal machines and, more particularly, to compact material removal machines.

BACKGROUND

Conventional material removal machines (e.g., saws, grinders, and/or polishers) are either stationary or configured to be moved and/or manipulated by human hands. Some of the more modern material removal systems have material removal machines configured for movement via machine assemblies. However, many components necessary to operation of the material removal machines remain separate and/or stationary. This can create awkward and/or inefficient systems, where the necessary components must accommodate movement of the material removal machines without moving themselves.

Limitations and disadvantages of conventional and traditional approaches will become apparent to one of skill in the art, through comparison of such systems with the present disclosure as set forth in the remainder of the present application with reference to the drawings.

SUMMARY

The present disclosure is directed to compact material removal machines, for example, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

Figure 1:
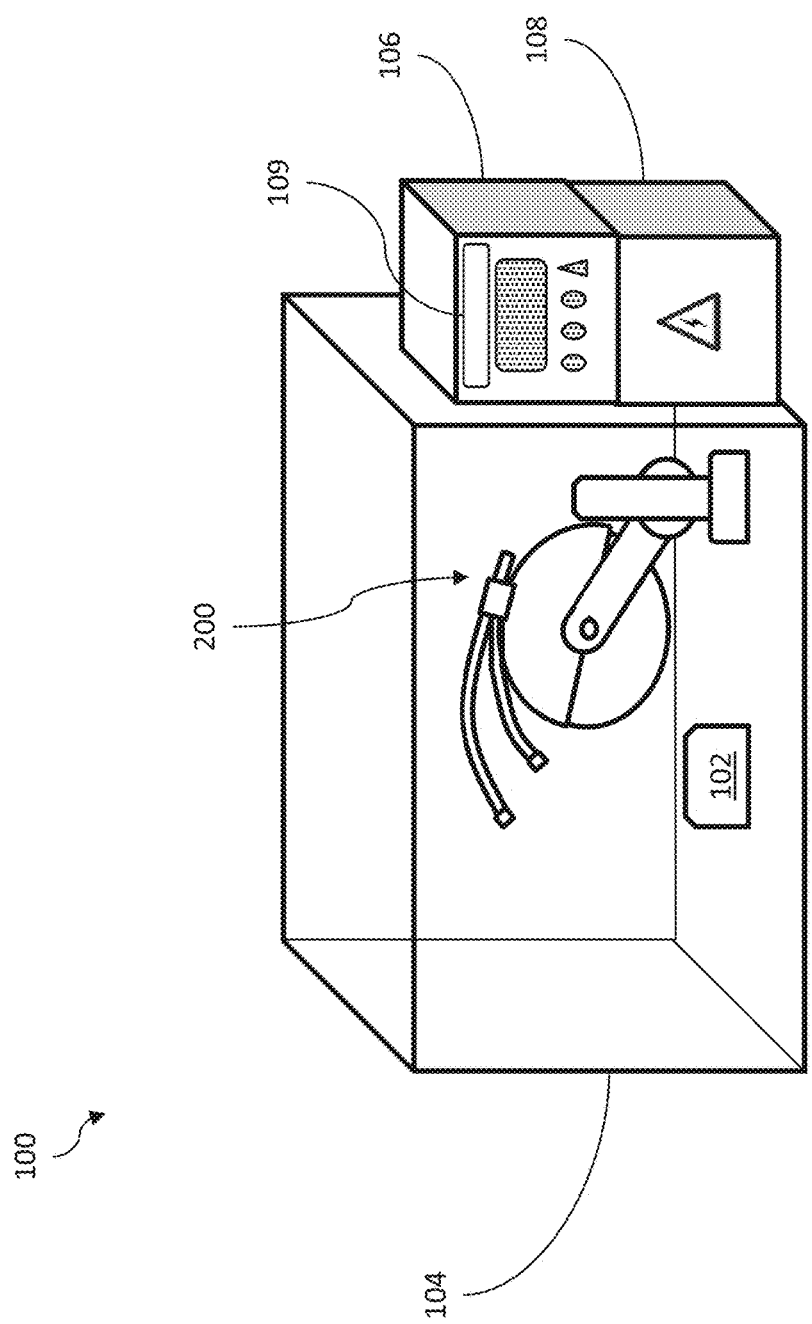
FIG. 1 is a perspective view of an example material removal system, in accordance with aspects of this disclosure.

The figures are not necessarily to scale. Where appropriate, the same or similar reference numerals are used in the figures to refer to similar or identical elements. For example, reference numerals utilizing lettering (e.g., upper support rail 202a, lower support rail 202b) refer to instances of the same reference numeral that does not have the lettering (e.g., support rails 202).

DETAILED DESCRIPTION

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein, the terms "coupled," "coupled to," and/or "coupled with," each mean a structural and/or electrical connection, whether attached, affixed, connected, joined, fastened, linked, and/or otherwise secured. The term "attach" means to affix, couple, connect, join, fasten, link, and/or otherwise secure. The term "connect," means to attach, affix, couple, join, fasten, link, and/or otherwise secure.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit and/or controller may include digital and/or analog circuitry, discrete and/or integrated circuitry, microprocessors, DSPs, etc., software, hardware and/or firmware, located on one or more boards, that form part or all of a controller, and/or are used to control a material removal assembly.

The term "power" is used throughout this specification for convenience, but also includes related measures such as energy, current, voltage, and/or enthalpy. For example, measuring and/or controlling "power" may involve measuring and/or controlling voltage, current, energy, and/or enthalpy.

Some examples of the present disclosure relate to a material removal apparatus, comprising a material removal tool, a support configured for coupling to a movement assembly, and a tool actuator retained by the support, the tool actuator configured to actuate the material removal tool.

In some examples, the material removal tool comprises a cutting, grinding, or polishing disc and the tool actuator comprises a motor. In some examples, the tool actuator is encased within an actuator housing of the support. In some examples, the tool actuator is connected to the material removal tool through a mechanical linkage, the mechanical linkage retained by the support. In some examples, the material removal tool is secured on a spindle that is retained by the support, the tool actuator configured to actuate the material removal tool by turning the spindle. In some examples, the tool actuator is connected to the spindle through a mechanical linkage retained by the support. In some examples, the mechanical linkage comprises a spindle pulley coupled to the spindle, an actuator pulley coupled to the tool actuator, and a belt connecting the spindle pulley to the actuator pulley. In some examples, the belt, spindle pulley, and actuator pulley are encased within an arm of the support. In some examples, the support comprises a nut or sleeve configured for coupling to the movement assembly. In some examples, the support further comprises a second sleeve configured to receive a guide shaft of the movement assembly.

Some examples of the present disclosure relate to a material removal system, comprising a movement assembly, and a material removal machine configured for movement via the movement assembly, the material removal machine comprising a material removal tool, and a tool actuator configured to actuate the material removal tool.

In some examples, the material removal tool comprises a cutting, grinding, or polishing disc, and the tool actuator comprises a motor. In some examples, the material removal machine further comprises a support having an actuator housing, the tool actuator encased within the actuator housing. In some examples, the tool actuator is connected to the material removal tool through a mechanical linkage, the mechanical linkage retained by the support. In some examples, the material removal tool is secured on a spindle that is retained by the support, the mechanical linkage being connected to the spindle. In some examples, the mechanical linkage comprises a spindle pulley coupled to the spindle, an actuator pulley coupled to the tool actuator, and a belt connecting the spindle pulley and the actuator pulley. In some examples, the belt, spindle pulley, and actuator pulley are encased within an arm of the support. In some examples, the material removal machine further comprises a shaft coupler, and the movement assembly comprises an actuation shaft in mechanical communication with the shaft coupler, the actuation shaft configured to move the material removal machine via the shaft coupler. In some examples, the material removal machine further comprises a sleeve configured to receive a support rail of the movement assembly. In some examples, the movement assembly further comprises a first end plate, a second end plate, and a plate actuator configured to move the first end plate and second end plate, the support rail extending between and retained by the first end plate and the second end plate.

In conventional material removal systems, a material removal tool is moved via some movement assembly, and actuated via a tool actuator that is connected to the material removal tool through a mechanical linkage (e.g., various gears, pulleys, belts, etc.). Conventionally, however, the tool actuator and/or mechanical linkage is separate and/or stationary for various reasons, such as, for example, size and/or power requirements. This separation resulted in the need for the tool actuator and/or the mechanical linkage to be able to accommodate movement of the material removal tool without moving itself. The resulting arrangement was awkward, complex, and/or inefficient.

Some examples of the present disclosure relate to more compact and/or efficient material removal systems, such as, for example, saw, grinder, polisher, and/or more general material preparation and/or testing systems. In some examples, the material removal system includes a material removal machine that is configured to move via a material removal assembly. In some examples, the material removal machine includes a material removal tool actuated by a tool actuator connected to the material removal tool through a mechanical linkage. The tool actuator is integrated into the material removal machine, along with the mechanical linkage, such that the tool actuator and the mechanical linkage move with the material removal machine.

FIG. 1 shows a simplified illustration of an example material removal system 100. As shown, the material removal system 100 includes a material removal assembly 200 and a table 102 substantially enclosed within a cabinet 104 (and/or housing). The table 102 is configured to retain a material sample (not shown), upon which the material removal assembly 200 may operate. In the example of FIG. 1, the material removal assembly 200 further includes a user interface (UI) 106, control circuitry 109, and a power source 108. While shown outside of the cabinet in FIG. 1, in some examples, the UI 106, control circuitry 109, and/or power source 108 may be positioned within the cabinet 104, and/or be part of the material removal assembly 200.

In some examples, the UI 106 may comprise user accessible inputs and/or outputs. For example, the UI 106 may comprise one or more visual outputs (e.g., touch display screens, video monitors, light emitting diodes, incandescent lights, and/or other lights, etc.) and/or one or more audio outputs (e.g., audio speakers). In some examples, the UI 106 may further comprise one or more visual inputs (e.g., touch display screens, buttons, knobs, switches, etc.) and/or one or more audio inputs (e.g., microphones). In some examples, the UI 106 may further comprise one or more input and/or output ports and/or devices (e.g., universal serial bus (USB) ports, audio ports, HDMI ports, network ports, disc drives, compact disc drives, digital video disc drives, etc.). In some examples, the UI 106 may further include one or more wireless communication devices (e.g., short range communication devices, radio devices, wireless network devices, etc.) configured to enable wireless communication between a third party device and the user interface 106.

In some examples, the control circuitry 109 is connected to (and/or in electrical communication with) the UI 106. In some examples, the control circuitry 109 is further connected to (and/or in electrical communication with) the various actuators and/or controllers of the material removal assembly 200, as further discussed below. In some examples, the control circuitry is configured to receive one or more input signals from the UI 106 and/or the various actuators and/or controllers of the material removal assembly 200. In some examples, the control circuitry is further configured to output one or more control (and/or command) signals to the UI 106 and/or the various actuators and/or controllers of the material removal assembly 200.

In some examples, the power source 108 may be configured to provide power to the UI 106, the control circuitry 109, and/or the various actuators and/or controllers of the material removal assembly 200, as further discussed below. In some examples, the UI 106, control circuitry 109, and/or the various actuators and/or controllers of the material removal assembly 200 may include one or more power sources configured to provide power to themselves. In some examples, the controllers of the material removal assembly 200 may direct power to the one or more actuators of the material removal assembly 200.

Figure 2A:
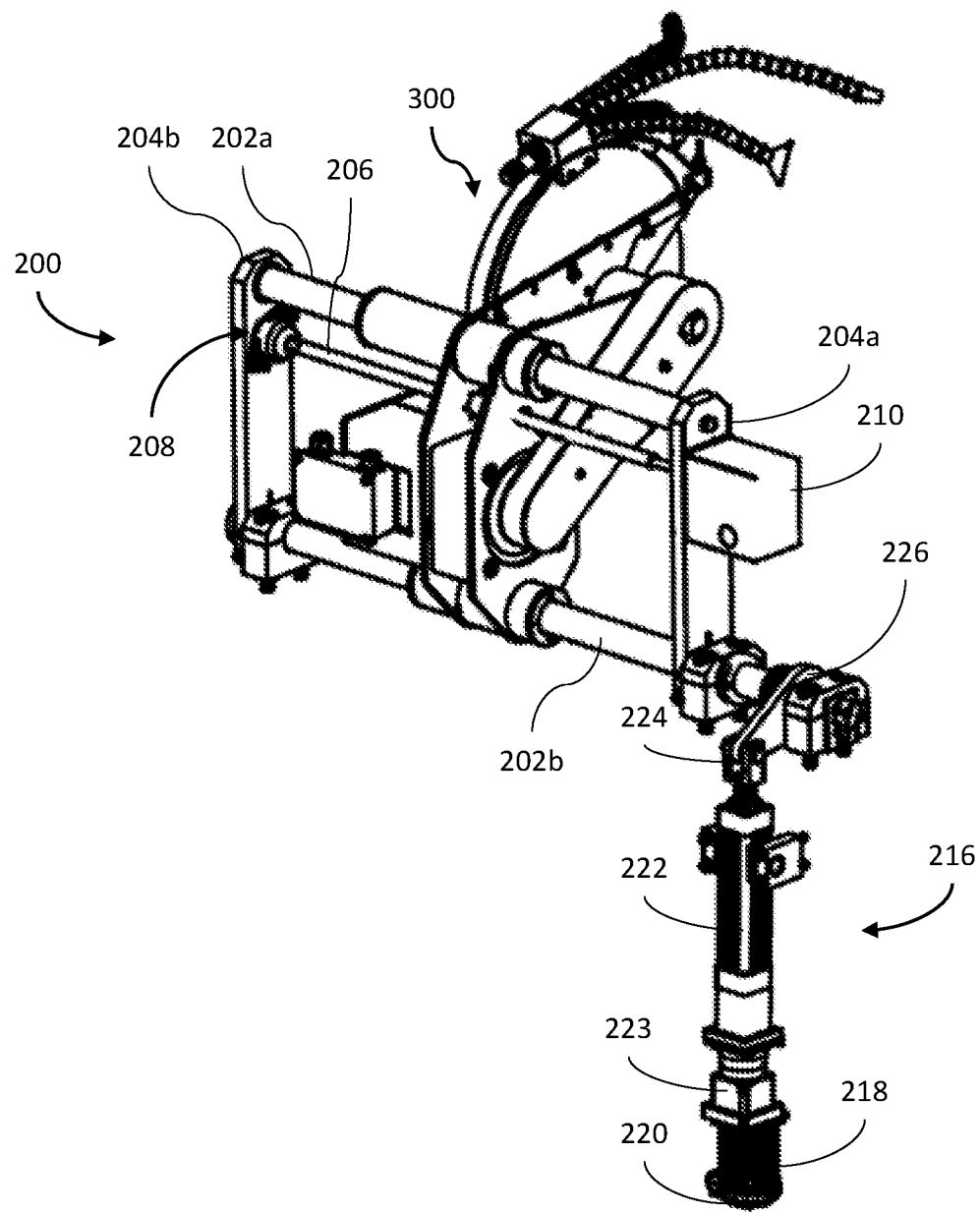
FIG. 2a is a rear perspective view of an example material removal assembly of the material removal system of FIG. 1, in accordance with aspects of this disclosure.
Figure 2B:
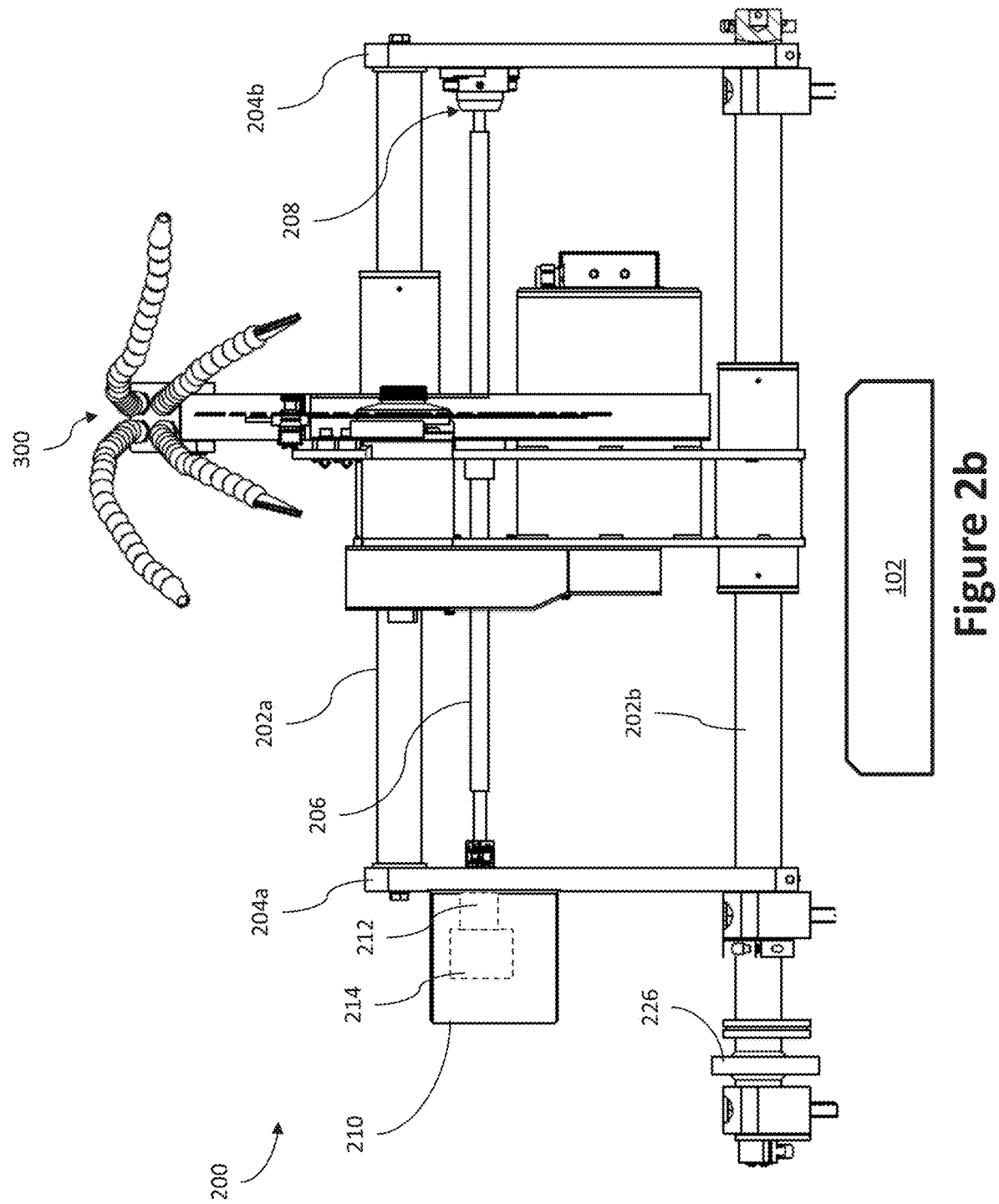
FIG. 2b is a front view of the example material removal assembly of FIG. 2a, along with a table of the material removal system of FIG. 1, in accordance with aspects of this disclosure.

FIGS. 2*a* and 2*b* show a rear perspective view and a front view, respectively, of the example material removal assembly 200. As shown, the material removal assembly 200 includes a material removal machine 300 retained on an upper support rail 202*a* and a lower support rail 202*b* between a first end plate 204*a* and a second end plate 204*b*. In the example of FIG. 2*b*, the table 102 is also positioned between the first end plate 204*a* and the second end plate 204*b*. The support rails 202 extend through the material removal machine 300 and are retained by the end plates 204. More particularly, the support rails 202 extend through sleeves 308 of the material removal machine, as shown, for example, in FIGS. 2*a*-3*a*.

In the examples of FIGS. 2*a* and 2*b*, an actuation shaft 206 extends between the end plates 204 and through the material removal machine 300. More particularly, the actuation shaft 206 extends through a nut 302 of the material removal machine 300 (see, e.g., FIG. 3*b*). Though not shown, the actuation shaft 206 may include engagement features, such as screw threads, for example. The engagement features may engage with complementary engagement features (e.g., threaded grooves) of the nut 302 of the material removal machine 300. As shown, the actuation shaft 206 is positioned vertically between the support rails 202 and rotatably attached to the second end plate 204*b*. More particularly, the actuation shaft 206 is attached to the second end plate 204*b* at a bearing 208. The bearing 208 is configured to retain an end of the actuation shaft 206 to the second end plate 204*b*, while allowing the actuation shaft 206 to rotate within the bearing 208. The other end of the actuation shaft 206 is rotatably attached to the first end plate 204*a*.

In the example of FIGS. 2*a* and 2*b*, an actuation housing 210 is also attached to the first end plate 204*a* proximate to the attachment point of the actuation shaft 206. Within the actuation housing 210 is a shaft actuator 212 (e.g., a motor) in mechanical communication with the actuation shaft 206. As shown, the shaft actuator 212 is in electrical communication with a shaft actuator controller 214. The shaft actuator 212 is configured to turn the actuation shaft 206 in response to input (e.g., one or more control signals) from the shaft actuator controller 212. When turned, the engagement features of the actuation shaft 206 engage with the complementary engagement features of the nut 302 to move (e.g., push and/or pull) the material removal machine 300 along the support rails 202 towards and/or away from the first end plate 204*a*, second end plate 204*b*, and/or table 102. In some examples, the movement direction of the material removal machine 300 depends upon the rotation direction of the actuation shaft 206. The support rails 202 define an axis along which the material removal machine 300 is configured to move linearly. In some examples, the shaft actuator 212 and/or shaft actuator controller 212 may be otherwise positioned.

In the example of FIG. 2*a*, the material removal assembly 200 further includes a rail actuator unit 216 configured to turn the lower support rail 202. As shown, the rail actuator unit 216 comprises a rail actuator 218 (e.g., a servo motor and/or other motor) and a rail actuator controller 220. The rail actuator 218 is configured to turn the lower support rail 202 in response to input (e.g., one or more control signals) from the rail actuator controller 220.

In the example of FIG. 2*a*, the rail actuator unit 216 is a linear actuator. More particularly, the rail actuator 218 of the rail actuator unit 216 is in mechanical communication with an actuation rod 222 through a gearbox 223, such that the gearbox 223 translates actuation of the rail actuator 218 into linear (and/or linearly reciprocating) movement of the actuation rod 222. An end of the actuation rod 222 is attached to a coupler 224 that is coupled to an armature 226 of the lower support rail 202*b*. The coupler 224 and/or armature 226 translate linear movement of the actuation rod 222 into rotational movement of the lower support rail 202*b*. When the lower support rail 202*b* is turned, the lower support rail 202*b* moves the end plates 204 about the lower support rail 202*b*. The end plates 204, in turn, move the upper guide rail 202*a* and the actuation shaft 206 about the lower support rail 202*b*. The movement of the upper guide rail 202*a* forces the material removal machine 300 to also move about the lower support rail 202*b*. Thus, rotation of the lower support rail 202*b* causes rotation of the material removal machine 300 about an axis defined by the lower support rail 202*b*.

Figure 3A:
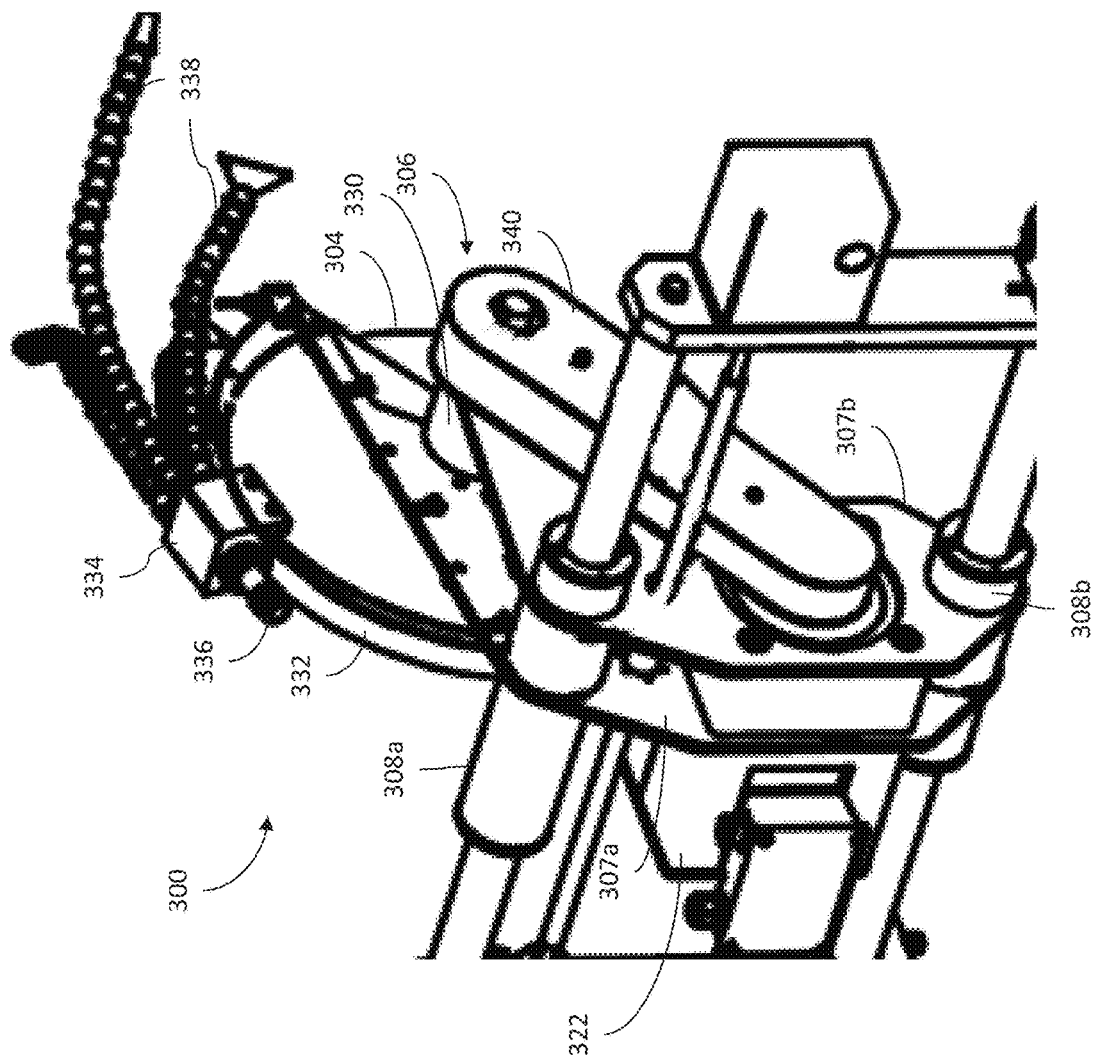
FIG. 3a is an enlarged rear perspective view of an example material removal machine of the material removal assembly of FIG. 2a, in accordance with aspects of this disclosure.
Figure 3B:
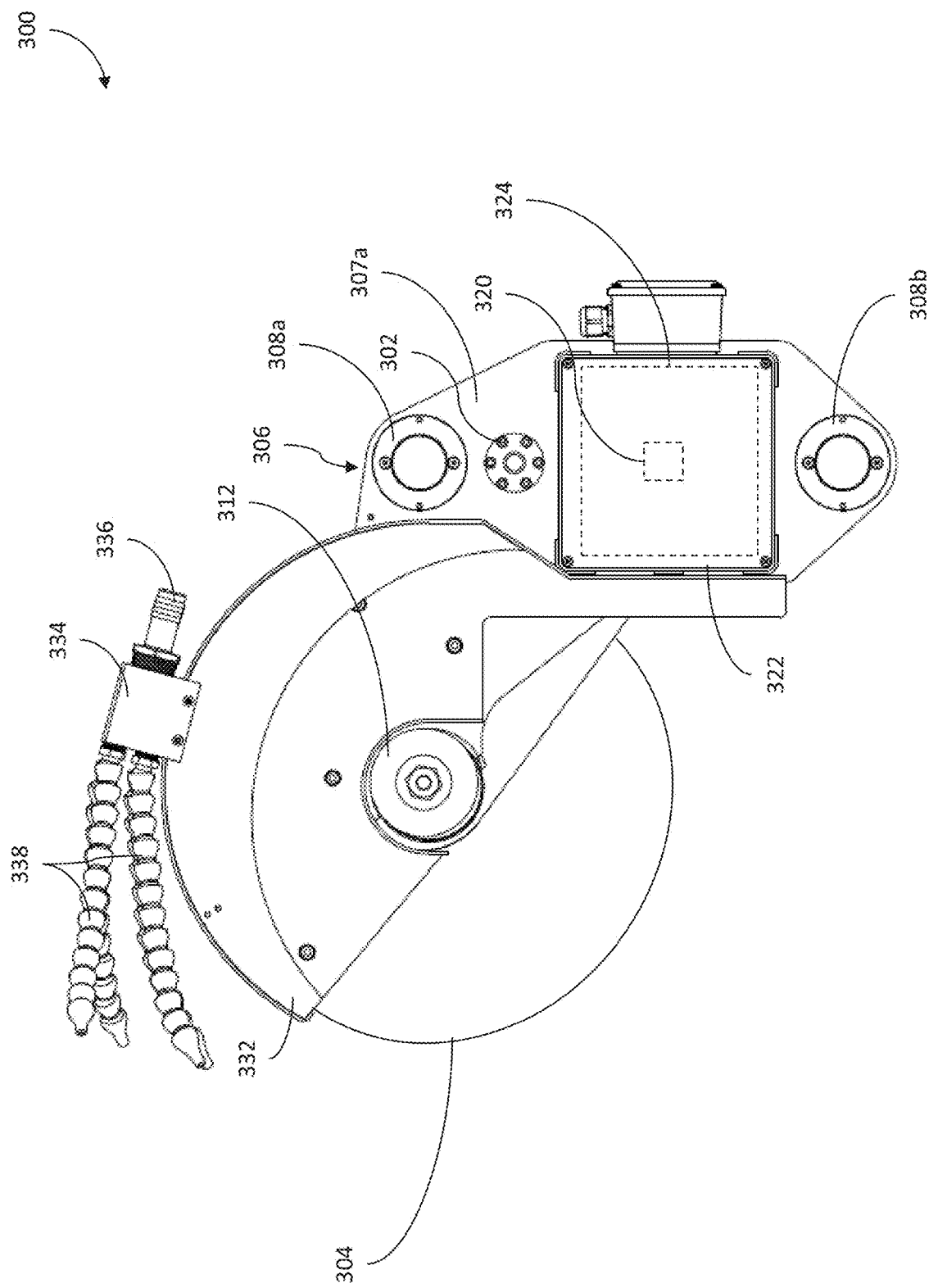
FIG. 3b is a side view of the example material removal machine of FIG. 3a, in accordance with aspects of this disclosure.
Figure 3C:
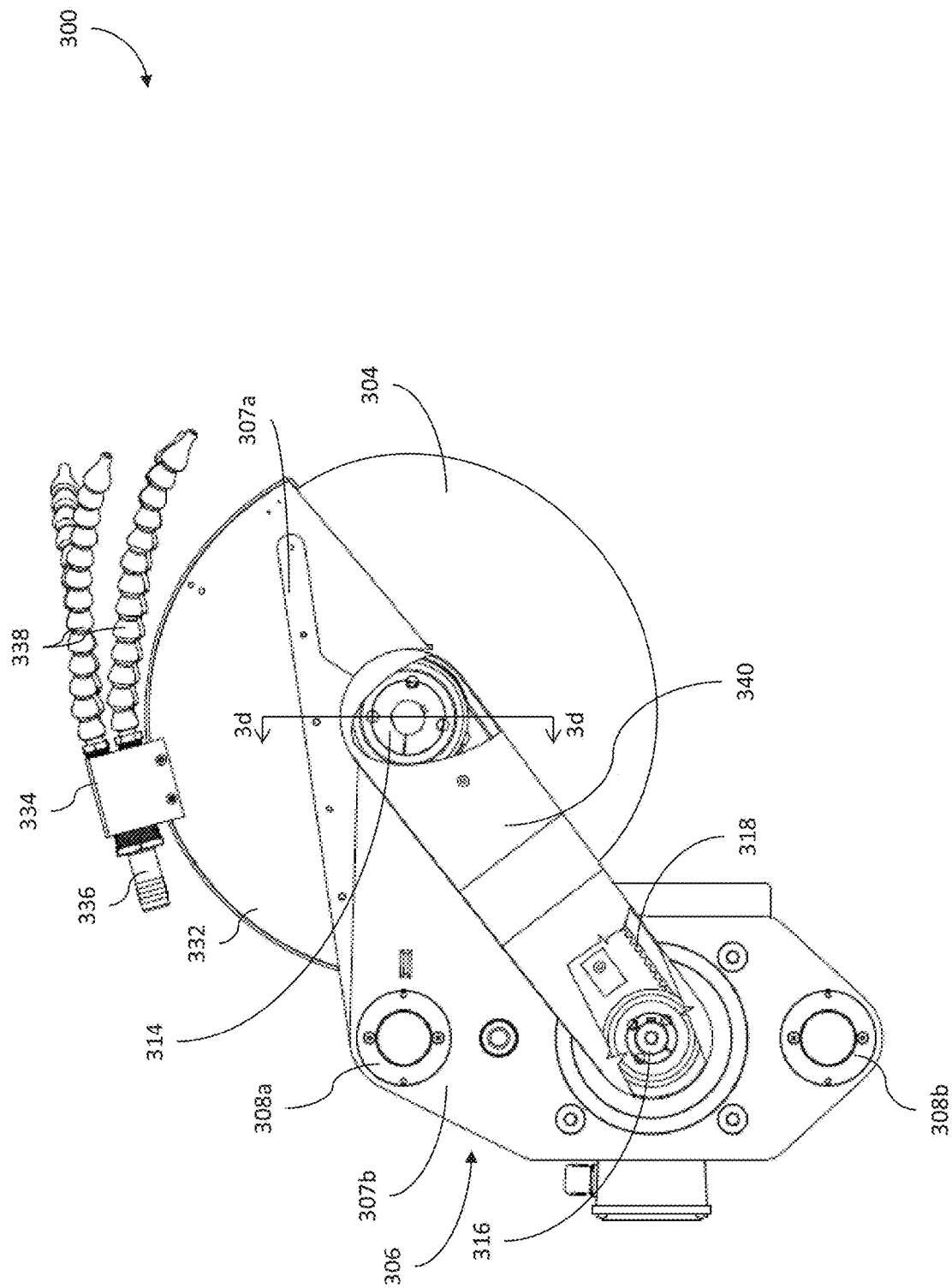
FIG. 3c is an opposite side view of the example material removal machine of FIG. 3a, in accordance with aspects of this disclosure.
Figure 3D:
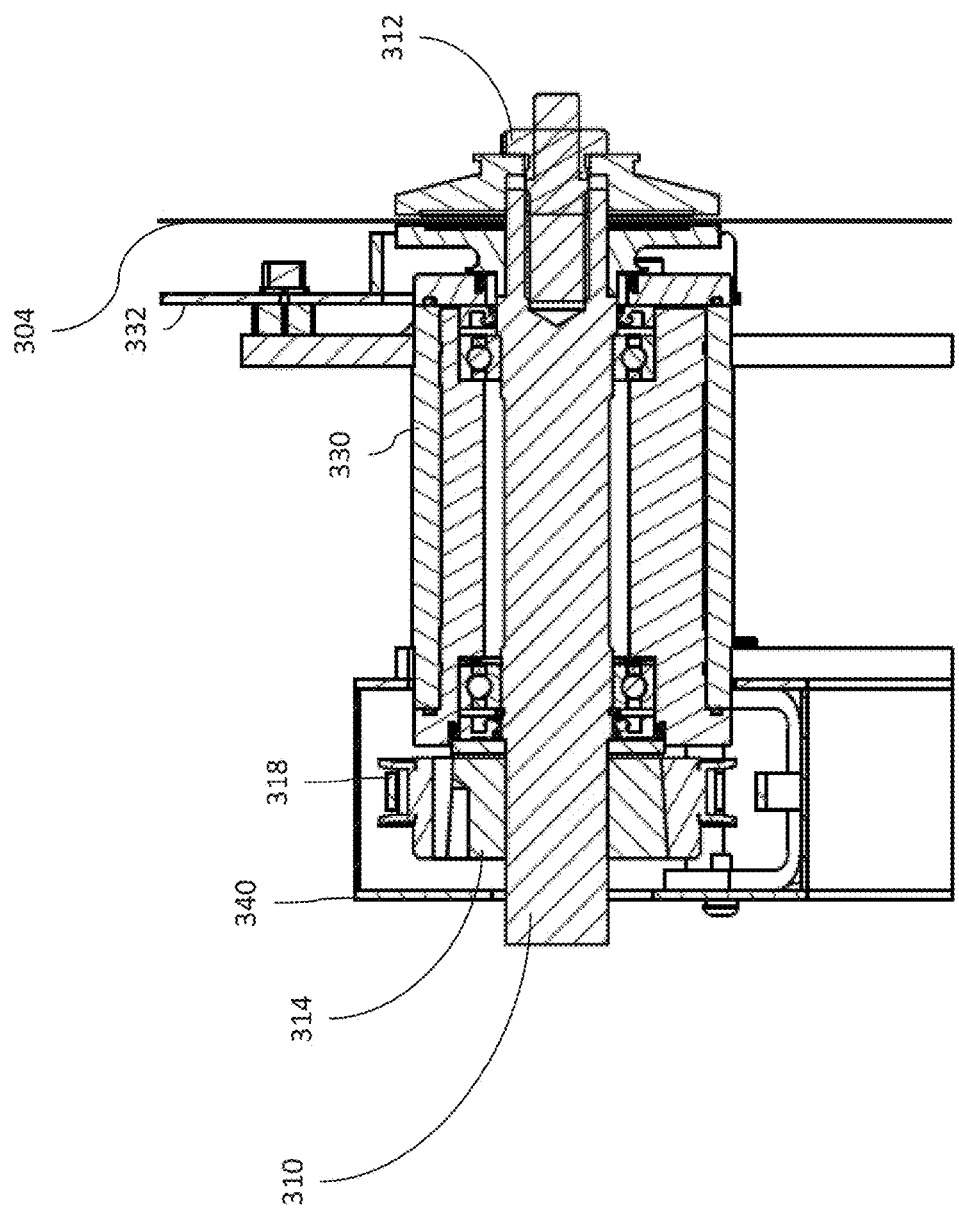
FIG. 3d is a cross section view of a portion of the example material removal machine of FIG. 3a, along the line 3d-3d in FIG. 3c, in accordance with aspects of this disclosure.
Figure 6:
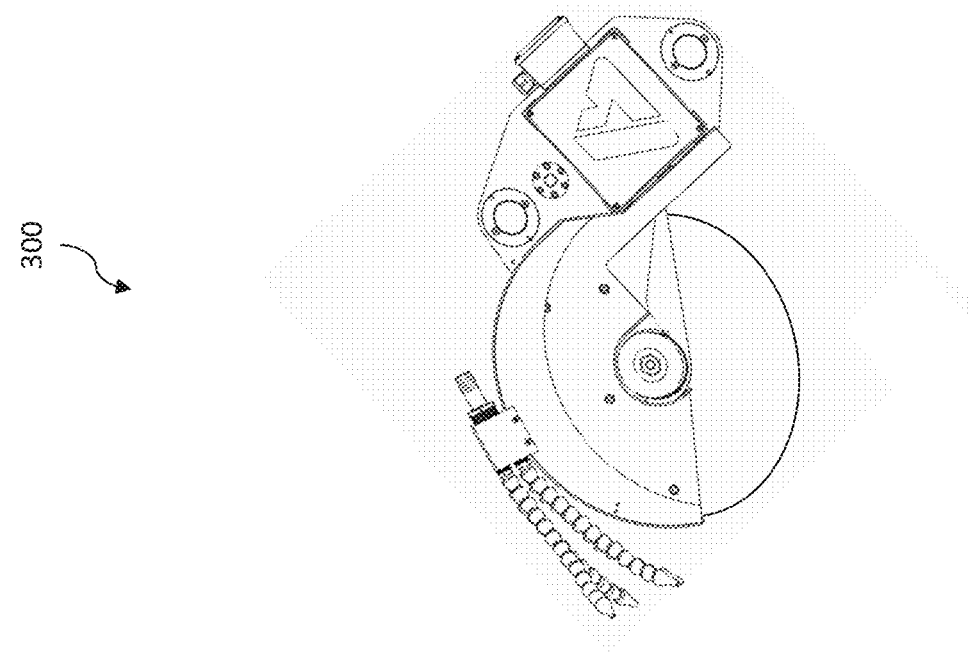
FIGS. 4-6 illustrate rotational movement of the material removal machine of FIG. 3, in accordance with aspects of this disclosure.
Figure 5:
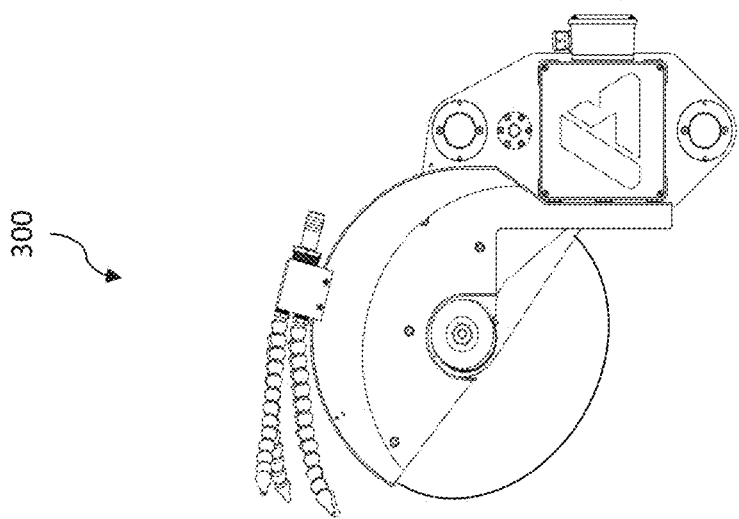
Figure 4:
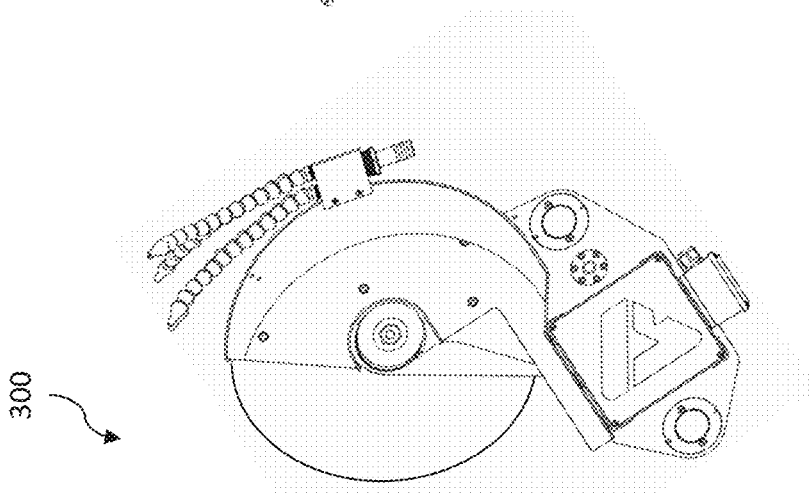

FIGS. 4-6 illustrate example rotational movement of the material removal machine 300 via the rail actuator 218 from a side view of the material removal machine 300. In the example of FIG. 4, the material removal machine 300 is in a retracted position, rotated rearward. In the example of FIG. 5, the material removal machine 300 has been rotated forward somewhat, to a position such as shown in FIGS. 2*a*-3*d*. In the example of FIG. 6, the material removal machine 300 has been rotated even farther forward.

FIGS. 3*a*-3*c* show various views of the material removal machine 300. FIG. 3*a* is an enlarged rear perspective view, while FIGS. 3*b* and 3*c* are side views of the material removal machine 300, with some of the other elements of the material removal assembly 200 removed for the sake of clarity. As shown, the material removal machine 300 includes a material removal tool 304 (e.g., a saw blade, abrasive saw, grinder, polisher, etc.) coupled to a support 306. In the example of FIGS. 3*a*-3*d*, the material removal tool 304 is a disc.

In the example of FIG. 3*a*, the support 306 comprises two substantially parallel support plates 307: a first support plate 307*a* and a second support plate 307*b*. The support plates 307 are connected through the sleeves 308 (upper sleeve 308*a* and lower sleeve 308*b*), a spindle housing 330, and a tool actuator housing 322. The tool actuator housing 322 encloses a tool actuator 320 and/or tool actuator controller 324, as further discussed below. The spindle housing 330 encloses at least a portion of a spindle 310, upon which the material removal tool 300 is secured. The sleeves 308 are attached to and/or extend through the support plates 307. The sleeves 308 further encircle portions of the support rails 202. This allows the sleeves 308 to guide the material removal machine 300 along the support rails 202 when the actuator shaft 206 moves the material removal machine linearly, and further retains the material removal machine 300 on the support rails when the support rails 202 are moved rotatably.

In the examples of FIGS. 3a-3d, the material removal machine 300 further includes a shield 332 connected to the support plate 307a. The shield 332 partially encloses (and/or encases) the material removal tool 300. A coolant manifold 334 is attached to an upper portion of the shield 332. As shown, the coolant manifold 334 includes a coolant inlet 336 in fluid communication with several coolant outlets 338. The support plate 307a also includes the nut 302. The material removal tool 304 is coupled to the support 306 via a spindle 310, as shown, for example, in FIG. 3d.

As shown in the example of FIGS. 3a-3d, the spindle 310 extends through a center (and/or central aperture) of the material removal tool 304. As shown, the spindle 310 is substantially cylindrical and/or encased within an arm 340 of the support and a substantially cylindrical spindle housing 330. The spindle housing 330 extends between and/or attaches to the support plates 307. A fastener 312 that attaches to an end of the spindle 310 secures the material removal tool 304 on the spindle 310. As shown, the fastener 312 is a nut, but in other examples the fastener 312 may be a nut, bolt, screw, nail, and/or any other type of appropriate fastener. In the example of FIG. 3d, the spindle 310 also extends through a center (and/or central aperture) of a spindle pulley 314 at the other end of the spindle 310 from the fastener 312. When the spindle pulley 314 turns, the spindle pulley 314 engages (and/or urges, moves, forces, acts on, etc.) the spindle 310 to turn the spindle 310 and the material removal tool 304.

In the example of FIG. 3c, an actuator pulley 316 is mechanically connected to the spindle pulley 314 via a belt 318, such that the belt 318 translates rotation of the actuator pulley 316 into rotation of the spindle pulley 314. As shown, the actuator pulley 316 is mechanically connected to a tool actuator 320 (e.g., an electrical motor) configured to turn the actuator pulley. In the example of FIG. 3b, the tool actuator 320 is encased in the tool actuator housing 322 of the support 306. In some examples, the tool actuator 320 may be a servo motor. As shown, a tool actuator controller 324 is also encased within the actuator housing 322. In some examples, the tool actuator controller 324 may be otherwise positioned. The tool actuator controller 324 is in electrical communication with the tool actuator 320. The tool actuator 320 is configured to turn the actuator pulley 316 in response to input (e.g., one or more control signals) from the tool actuator controller 324. When turned, the belt 318 translates rotation of the actuator pulley 316 into rotation of the spindle pulley 314, and the spindle 310 translates rotation of the spindle pulley 314 into rotation of the material removal tool 304.

In the examples of FIGS. 3a-3d, the tool actuator 320 and tool actuator controller 324 are encased within the support 306. The associated mechanical linkage that connects the tool actuator 320 to the spindle 310 (e.g., the actuator pulley 316, belt 318, and/or spindle pulley 314.) is encased (and/or retained) within the arm 340 of the support 306. In some examples, the actuator pulley 316 may be partially encased (and/or retained) within the tool actuator housing 322 attached to the support 306. Thus, when the material removal machine 300 is moved via the rail actuator 218 and/or shaft actuator 212, the tool actuator 320 and tool actuator controller 324 are moved therewith, along with the associated mechanical linkage, resulting in a neat, compact system, and avoiding much of the awkwardness and/or inefficiency of conventional systems.

While the present apparatus, systems, and/or methods have been described with reference to certain implementations, it will be understood by those skilled in the art that various changes may be made and equivalents may be substituted without departing from the scope of the present apparatus, systems, and/or methods. In addition, many modifications may be made to adapt a particular situation or material to the teachings of the present disclosure without departing from its scope. Therefore, it is intended that the present apparatus, systems, and/or methods not be limited to the particular implementations disclosed, but that the present apparatus, systems, and/or methods will include all implementations falling within the scope of the appended claims.

What is claimed is:

1. A material removal system, comprising:
    a material removal machine comprising:
        a material removal tool secured to a spindle, the material removal tool configured to rotate about a tool rotation axis defined by the spindle,
        a tool actuator configured to actuate the material removal tool, and
        a support assembly that supports the material removal tool, the spindle, and the tool actuator, the support assembly comprising a sleeve;
    a movement assembly coupled to the support assembly, the movement assembly comprising:
        a guide rail encircled by the sleeve of the support assembly,
        an actuation shaft configured to move the support assembly along the guide rail in a movement direction that is parallel to the guide rail and the tool rotation axis defined by the spindle, and
        a rail rotator configured to rotate the support assembly about a support rotation axis defined by the guide rail, the support rotation axis being parallel to the tool rotation axis; and
    a cabinet that houses the movement assembly and the material removal machine.

2. The system of claim 1, wherein the material removal tool comprises a cutting, grinding, or polishing disc, and the tool actuator comprises a motor configured to actuate the material removal tool by turning the spindle.

3. The system of claim 1, wherein the support assembly comprises an actuator housing, the tool actuator being encased within the actuator housing, the tool actuator being connected to the material removal tool through a mechanical linkage that is encased in an arm of the support assembly, the mechanical linkage comprising a spindle pulley coupled to the spindle, an actuator pulley coupled to the tool actuator, and a belt connecting the spindle pulley to the actuator pulley.

4. The system of claim 1, wherein the material removal machine further comprises a cooling device supported by the support assembly.

5. The system of claim 1, wherein the material removal machine further comprises a shaft coupler, and wherein the actuation shaft is in mechanical communication with the shaft coupler, the actuation shaft configured to move the material removal machine in the movement direction via the shaft coupler.

6. The system of claim 1, further comprising an electronic user interface; and control circuitry configured to control the movement assembly or the tool actuator.

7. The system of claim 1, wherein the guide rail comprises a first guide rail, the sleeve comprises a first sleeve, the movement assembly further comprises a second guide rail extending parallel to the first guide rail, the support assembly further comprises a second sleeve that encircles the second guide rail, and the movement assembly further comprises a first end plate, a second end plate, and a plate actuator configured to move the first end plate and second end plate, the first guide rail and the second guide rail extending between and retained by the first end plate and the second end plate.

* * * * *